(12) United States Patent
Aoki

(10) Patent No.: US 11,438,468 B2
(45) Date of Patent: Sep. 6, 2022

(54) APPARATUS MANAGEMENT SYSTEM, REMOTE MANAGEMENT APPARATUS, AND REMOTE MANAGEMENT METHOD

(71) Applicant: Satoshi Aoki, Kanagawa (JP)

(72) Inventor: Satoshi Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/464,678

(22) Filed: Sep. 2, 2021

(65) Prior Publication Data

US 2022/0103702 A1 Mar. 31, 2022

(30) Foreign Application Priority Data

Sep. 29, 2020 (JP) .............................. JP2020-162985

(51) Int. Cl.
*H04N 1/00* (2006.01)

(52) U.S. Cl.
CPC ..... *H04N 1/00344* (2013.01); *H04N 1/00244* (2013.01)

(58) Field of Classification Search
None
See application file for complete search history.

(56) References Cited

U.S. PATENT DOCUMENTS

| | | | |
|---|---|---|---|
| 2011/0231701 A1 | 9/2011 | Aoki | |
| 2017/0346963 A1 | 11/2017 | Mizunashi et al. | |
| 2019/0082058 A1 | 3/2019 | Aoki | |
| 2019/0289137 A1 | 9/2019 | Aoki | |
| 2019/0334916 A1* | 10/2019 | Asai | H04L 65/1069 |
| 2020/0044908 A1* | 2/2020 | Matsushima | H04L 41/0813 |
| 2020/0137166 A1 | 4/2020 | Aoki | |
| 2020/0177667 A1* | 6/2020 | Nagao | G06F 3/048 |
| 2020/0301646 A1 | 9/2020 | Aoki | |
| 2021/0392201 A1* | 12/2021 | Suzuki | H04L 63/08 |
| 2022/0070048 A1* | 3/2022 | Someya | H04L 41/04 |

FOREIGN PATENT DOCUMENTS

| | | |
|---|---|---|
| JP | 2009-071612 | 4/2009 |
| JP | 2011-076308 | 4/2011 |

* cited by examiner

*Primary Examiner* — Henok Shiferaw
(74) *Attorney, Agent, or Firm* — Xsensus LLP

(57) ABSTRACT

An apparatus management system, a remote management apparatus, and a remote management method. The apparatus management system receives from the apparatus information management apparatus, an apparatus registration request for registering a specific information providing apparatus among the one or more information providing apparatuses, in response to the apparatus registration request, transmits specific information acquisition destination information of the specific information providing apparatus to the apparatus information management apparatus, receives from the apparatus information management apparatus, an apparatus status information acquisition request for acquiring specific apparatus status information indicating the status of the specific information providing apparatus associated with the specific information acquisition destination information, and transmits the specific apparatus status information to the apparatus information management apparatus as a response to the apparatus status information acquisition request.

9 Claims, 11 Drawing Sheets

FIG. 5

| APPARATUS IDENTIFICATION INFORMATION (APPARATUS SERIAL NUMBER) | APPARATUS REGISTRATION RECEPTION CODE | REGISTRATION STATUS |
|---|---|---|
| G696JA00601 | 23kjhkjhd124lkd | ACCEPTED |
| G696JA00602 | kk10cnn17bhxjce | REGISTERED |
| ... | ... | ... |

FIG. 6A

| APPARATUS IDENTIFICATION INFORMATION (APPARATUS SERIAL NUMBER) | INFORMATION ACQUISITION DESTINATION |
|---|---|
| G696JA00601 | https://system_a/ |
| G696JA00602 | https://system_b/ |
| ... | ... |

FIG. 6B

| APPARATUS IDENTIFICATION INFORMATION (APPARATUS SERIAL NUMBER) | APPARATUS STATUS INFORMATION A (PARTS USAGE) | APPARATUS STATUS INFORMATION B (PARTS SERIAL NUMBER) | |
|---|---|---|---|
| G696JA00601 | XXX | YYY | ... |
| G696JA00602 | ZZZ | AAA | ... |
| ... | ... | ... | ... |

FIG. 7

| APPARATUS IDENTIFICATION INFORMATION (APPARATUS SERIAL NUMBER) | IP ADDRESS | LAST COLLECTION DATE AND TIME | CACHE DATA |
|---|---|---|---|
| G696JA00601 | xxx.xxx.xxx.xxx | 20200817150000 | "APPARATUS STATUS INFORMATION A": "XXX" |
| G696JA00602 | xxx.xxx.xxx.xxx | 20200817151000 | "APPARATUS STATUS INFORMATION B": "YYY" |
| ... | ... | ... | ... |

APPARATUS MANAGEMENT SYSTEM, REMOTE MANAGEMENT APPARATUS, AND REMOTE MANAGEMENT METHOD

CROSS-REFERENCE TO RELATED APPLICATIONS

This patent application is based on and claims priority pursuant to 35 U.S.C. § 119(a) to Japanese Patent Application No. 2020-162985, filed on Sep. 29, 2020 in the Japan Patent Office, the entire disclosure of which is hereby incorporated by reference herein.

BACKGROUND

Technical Field

The present disclosure relates to an apparatus management system, a remote management apparatus, and a remote management method.

Related Art

A system that remotely manages apparatuses residing in a local network such as a local area network (LAN) from outside the local network is known. In such a system, for example, remote management of apparatuses is implemented by communicating between an apparatus residing in the local network and an apparatus management system located outside the local network.

In order to remotely manage various apparatuses by a management apparatus, a specialized worker called a customer engineer needs to go to an installation location of the various apparatuses and connects the various apparatuses to the network and register the apparatus information of the various apparatuses in the management apparatus.

SUMMARY

Embodiments of the present disclosure describe an apparatus management system, a remote management apparatus, and a remote management method. The apparatus management system receives from the apparatus information management apparatus, an apparatus registration request for registering a specific information providing apparatus among the one or more information providing apparatuses, in response to the apparatus registration request, transmits specific information acquisition destination information of the specific information providing apparatus to the apparatus information management apparatus, receives from the apparatus information management apparatus, an apparatus status information acquisition request for acquiring specific apparatus status information indicating the status of the specific information providing apparatus associated with the specific information acquisition destination information, and transmits the specific apparatus status information to the apparatus information management apparatus as a response to the apparatus status information acquisition request.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of an apparatus registration management table according to embodiments of the present disclosure;

FIG. 6A is a diagram illustrating an example of an information acquisition destination management table according to embodiments of the present disclosure;

FIG. 6B is a diagram illustrating an example of an apparatus status information management table according to embodiments of the present disclosure;

FIG. 7 is a diagram illustrating an example of a manufacturer maintenance management table according to embodiments of the present disclosure;

Figure 1:
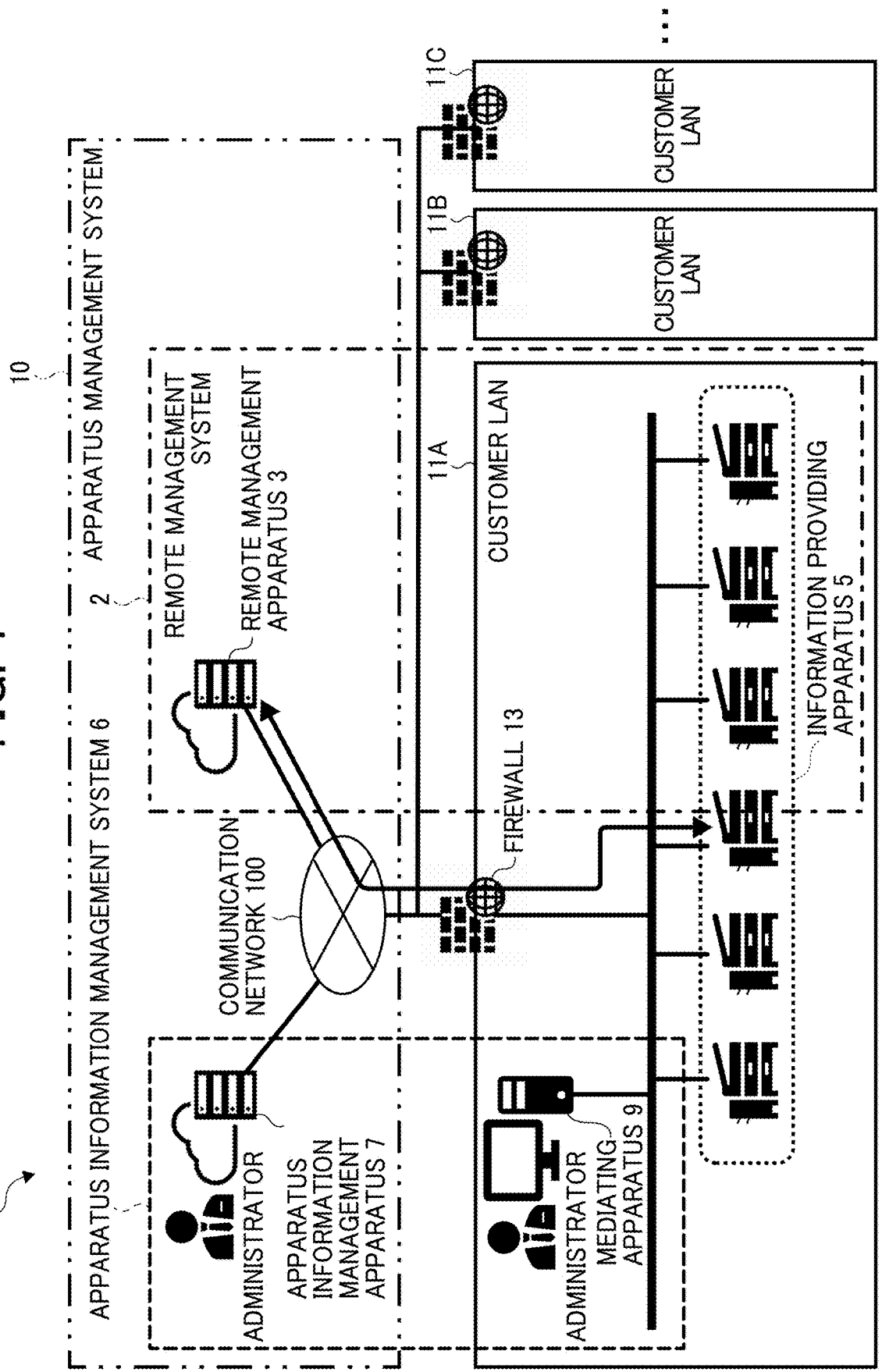
FIG. 1 is a diagram illustrating an example of an overall configuration of a communication system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, one or more embodiments of the present disclosure is described with reference to the drawings. In the description of the drawings, redundant description is omitted.

With reference to FIGS. 1 to 9, a first embodiment is described.

FIG. 1 is a diagram illustrating an example of an overall configuration of a communication system according to a first embodiment. In the communication system 1 illustrated in FIG. 1, a remote management apparatus 3 operated by a manufacturer that provides an information providing apparatus 5 is connected to a communication network 100. The remote management apparatus 3 manages data related to the information providing apparatus 5 connected to a customer local area network (LAN) 11A through the communication network 100 and a firewall 13. Here, the communication network 100 is implemented by the internet, a mobile communication network, a LAN, or the like. The communication network 100 may include, in addition to a wired communication, a wireless communication in compliance with, for example, 3rd Generation (3G), 4th Generation (4G), 5th Generation (5G), Worldwide Interoperability for Microwave Access (WiMAX), and Long Term Evolution (LTE). Further, the information providing apparatus 5 may include an apparatus implemented in another LAN such as a customer LAN 11B and a customer LAN 11C, in addition to the customer LAN 11A implemented through the firewall 13. The customer LANs 11A, 11B, 11C, etc. are collectively referred to as the customer LAN 11 unless they need to be distinguished from each other.

Further, in the communication system 1, an apparatus information management apparatus 7 connected to the communication network 100 belongs to a sales company or a dealer that sells and manages the information providing apparatus 5. The apparatus information management apparatus 7 connects to a mediating apparatus 9 that collects and searches various data such as status data from the information providing apparatus 5 through the firewall 13 and manages various data collected and searched by the mediating apparatus 9.

Further, the communication system 1 includes a remote management system 2 including a remote management apparatus 3 and the information providing apparatus 5, an apparatus information management system 6 including the apparatus information management apparatus 7 and the mediating apparatus 9, and the apparatus management system 10 including the remote management apparatus 3 and the apparatus information management apparatus 7. Further, the apparatus information management system 6 provides, for example, a solution related to a managed print service for dealers. In addition to the customer LAN 11A, the information providing apparatus 5 included in the remote management system 2 may include one or more information providing apparatuses 5 implemented in each customer LAN such as the customer LAN 11B and the customer LAN 11C, as illustrated in FIG. 1.

As described above, in the communication system 1 according to the present embodiment, the remote management apparatus 3 operated by the manufacturer and the apparatus information management apparatus 7 that provides the solution related to the managed print service for the dealer cooperate with each other and enables the apparatus information management apparatus 7 to efficiently utilize data such as status information related to the information providing apparatus 5.

The remote management apparatus 3 is for the manufacturer of the information providing apparatus 5 to remotely manage the information providing apparatus 5. The remote management apparatus 3 includes, for example, a function of monitoring the status of the information providing apparatus 5, changing a set value (also called a configuration), and aggregating and reporting a usage status of a customer. Further, the remote management apparatus 3 provides various services such as a remote diagnosis and maintenance service, an automatic counter reading service, a usage status report service, and an automatic toner delivery service.

The information providing apparatus 5 includes an image forming apparatus (multi-function peripheral (MFP)) using an electrophotographic method, the image forming apparatus using an inkjet method, an industrial printing machine, a commercial printing machine, and the like provided by the manufacturer. Further, the information providing apparatus 5 includes various communication apparatuses that communicate with a personal computer (PC) such as an interactive whiteboard (IWB), a video conferencing system (unified communication system (UCS)), and a projector.

The apparatus information management apparatus 7 includes a user interface (UI) capable of managing a plurality of manufacturers on a same screen and provides a console screen. The apparatus information management apparatus 7 acquires the apparatus identification information (apparatus serial number) of the information providing apparatus 5 and stores information acquisition destination information indicating an information acquisition destination associated with apparatus identification information and apparatus status information indicating a status of the information providing apparatus 5, in an environment where a plurality of customers are using the information providing apparatus 5 of any manufacturer.

The mediating apparatus 9 is an apparatus or software (tool) installed in an apparatus that is residing in the same customer LAN 11 as the information providing apparatus 5 and collectively manages a plurality of information providing apparatuses 5 of a plurality of manufacturers. The mediating apparatus 9 periodically makes an information acquisition request to the information providing apparatus 5 using, for example, Simple Network Management Protocol (SNMP) which is a standard protocol for apparatus management and transmits the acquired information to the apparatus information management apparatus 7. Also, the mediating apparatus 9, for example, receives a request from the apparatus information management apparatus 7 and transmits a request for setting change or the like to the information providing apparatus 5. Further, the mediating apparatus 9 receives information such as an error notice from the information providing apparatus 5 and transfers received information to the apparatus information management apparatus 7.

Figure 2:
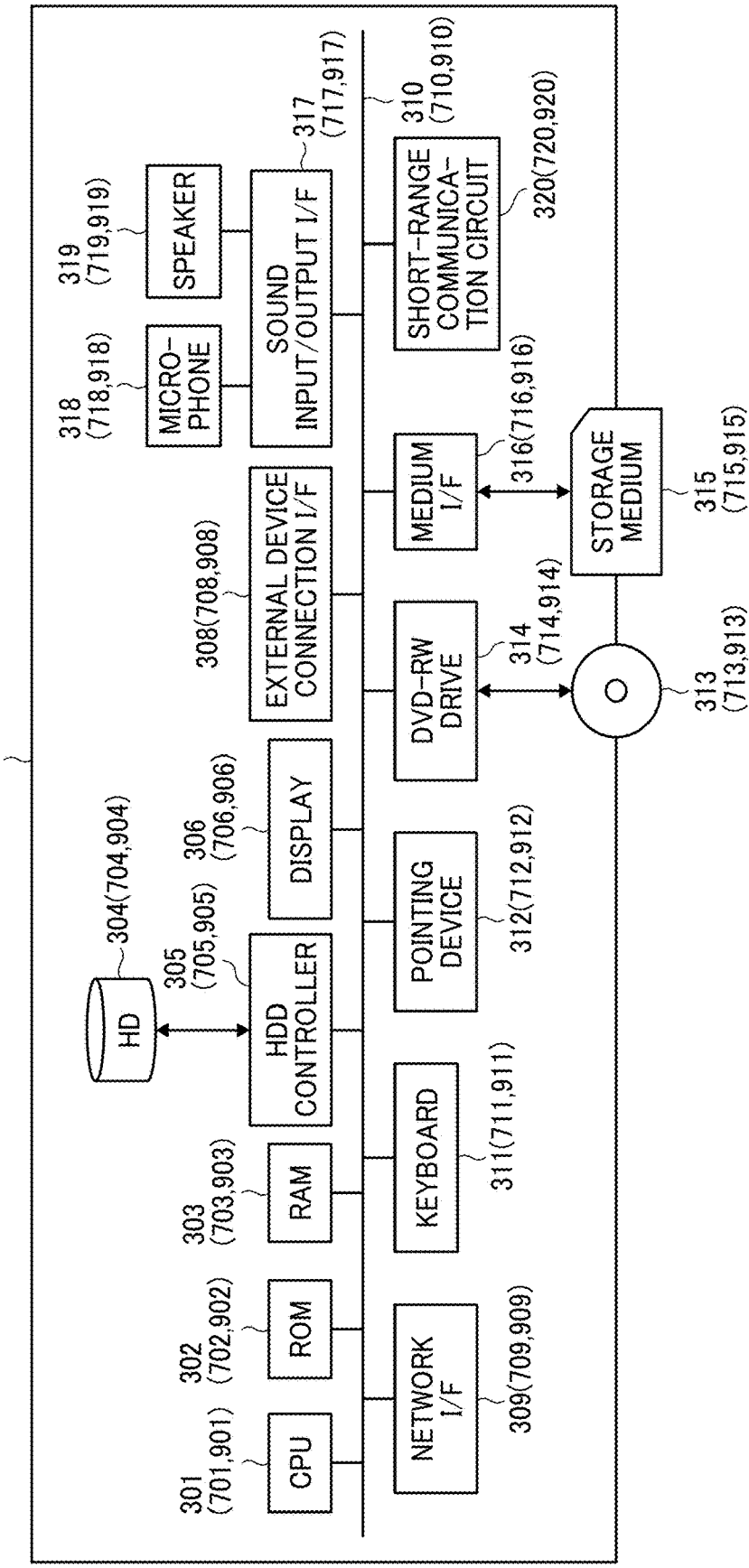
FIG. 2 is a block diagram illustrating an example of a hardware configuration of a computer according to embodiments of the present disclosure.

FIG. 2 is a block diagram illustrating an example of a hardware configuration of the remote management apparatus, the apparatus information management apparatus, and the mediating apparatus according to the present embodiment. As illustrated in FIG. 2, the remote management apparatus 3 is implemented by a computer including a central processing unit (CPU) 301, a read only memory (ROM) 302, a random access memory (RAM) 303, a hard disk (HD) 304, a hard disk drive (HDD) controller 305, a display 306, an external device connection interface (I/F) 308, a network I/F 309, a bus line 310, a keyboard 311, a pointing device 312, a digital versatile disc rewritable (DVD-RW) drive 314, a medium I/F 316, a sound input/output I/F 317, a microphone 318, a speaker 319 and a short-range communication circuit 320.

The CPU 301 controls the operation of the entire remote management apparatus 3. The ROM 302 stores a control program such as an initial program loader (IPL) to boot the CPU 301. The RAM 303 is used as a work area for the CPU 301. The HD 304 stores various data such as a program. The HDD controller 305 controls reading or writing of various data to the HD 304 according to the control of the CPU 301. The display 306 displays various information such as cursors, menus, windows, characters, or images. In one example, the display 306 is a touch panel display provided with an input device. The external device connection I/F 308 is an interface for connecting various external devices. The external device in this case is, for example, a universal serial bus (USB) memory or a printer. The network I/F 309 is an interface that controls communication of data through the communication network 100. The bus line 310 is an address bus, a data bus, or the like for electrically connecting each component such as the CPU 301 illustrated in FIG. 2.

The keyboard 311 is one example of an input device provided with a plurality of keys for enabling a user to input characters, numerals, or various instructions. The pointing device 312 is another example of the input device that allows a user to select or execute a specific instruction, select a target for processing, or move a cursor being displayed. The input device is not limited to the keyboard 311 and the pointing device 312, and may be a touch panel, a voice input device, or the like. The DVD-RW drive 314 controls reading or writing of various data to the DVD-RW 313 as an example of the removable recording medium. The removable recording medium is not limited to DVD-RW and may be a digital versatile disc recordable (DVD-R) or BLU-RAY (registered trademark) Disc, or the like. The medium I/F 316 controls reading or writing (storage) of data to a storage medium 315 such as a flash memory. The microphone 318 is an example of built-in audio collecting device configured to input sound. The sound input/output I/F 317 is a circuit for inputting or outputting an audio signal to the microphone 318 or from the speaker 319 under control of the CPU 301. The short-range communication circuit 320 is a communication circuit for communicating with an external terminal (device) by a short-range wireless communication technology such as Near Field Communication (NFC), BLUETOOTH (registered trademark) or Wi-Fi.

Figure 3:
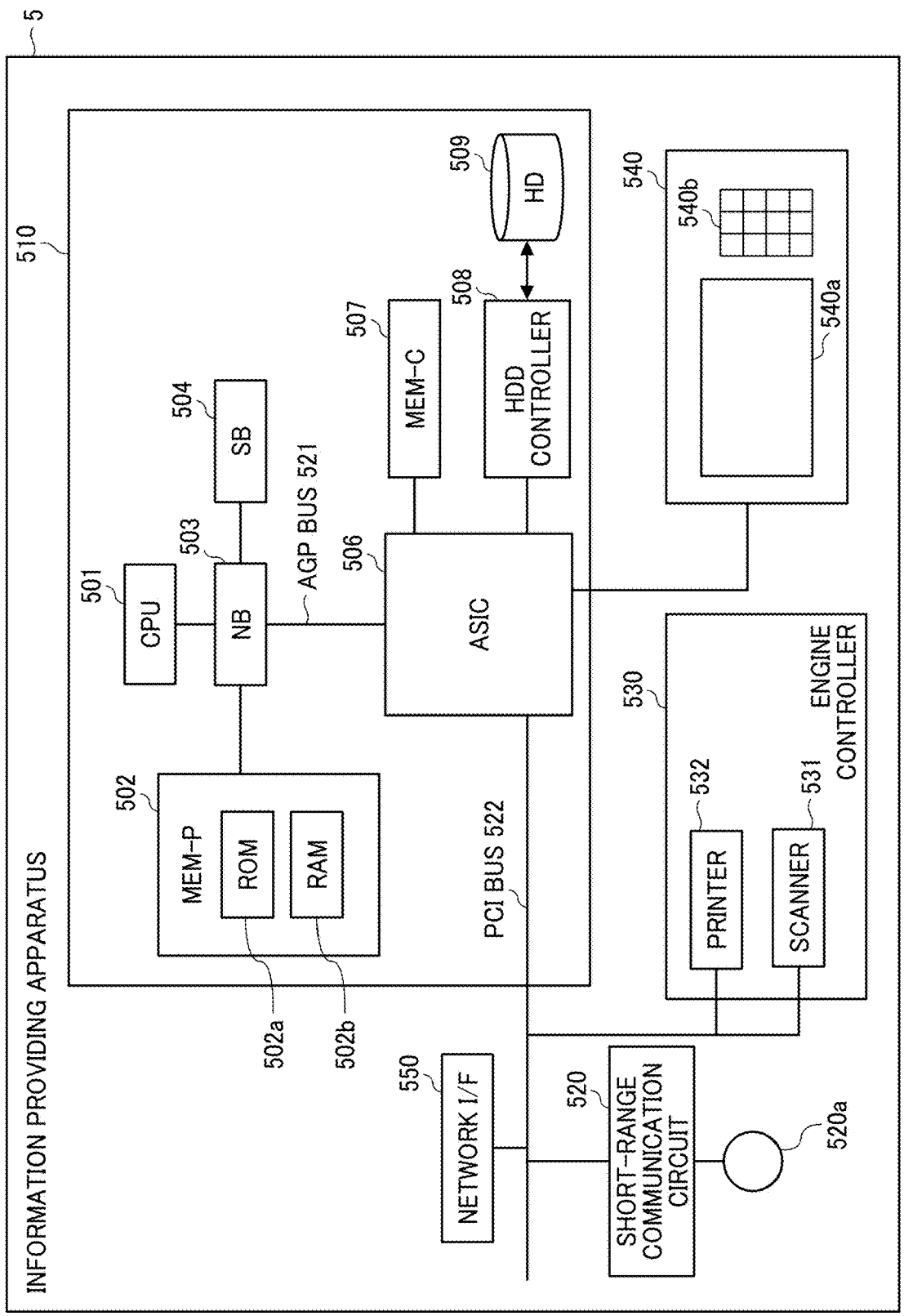
FIG. 3 is a block diagram illustrating an example of a hardware configuration of an information providing apparatus according to embodiments of the present disclosure.

Since the apparatus information management apparatus 7 is implemented by the computer and has the same configuration as the remote management apparatus 3 as illustrated in FIG. 3, description of each hardware is omitted.

Further, since the mediating apparatus 9 is implemented by the computer and has the same configuration as the remote management apparatus 3 as illustrated in FIG. 3, the description of each hardware is omitted.

Any one of the above-described control programs may be recorded in a file in a format installable or executable on a computer-readable storage medium for distribution. Examples of the storage medium include, but not limited to, Compact Disc Recordable (CD-R), Digital Versatile Disc (DVD), BLU-RAY (registered trademark) disc, Secure Digital (SD) card, Universal Serial Bus (USB) memory, and the like. In addition, such storage medium may be provided in a form of a program product to users within a certain country or outside that country. For example, the remote management apparatus 3 implements the remote management method according to the present disclosure by executing the program according to the present disclosure.

FIG. 3 is a block diagram illustrating an example of a hardware configuration of an information providing apparatus according to the present embodiment. As illustrated in FIG. 3, the information providing apparatus 5 includes a controller 510, a short-range communication circuit 520, an engine controller 530, a control panel 540, and a network I/F 550.

The controller 510 includes a CPU 501 as a main processor of the MFP, a system memory (MEM-P) 502, a north bridge (NB) 503, a south bridge (SB) 504, an application specific integrated circuit (ASIC) 506, a local memory (MEM-C) 507 as a storage unit, an HDD controller 508, and an HD 509 as a storage unit. The NB 503 and the ASIC 506 are connected through an Accelerated Graphics Port (AGP) bus 521.

The CPU 501 is a control unit that controls the entire information providing apparatus 5. The NB 503 connects the CPU 501 with the MEM-P 502, the SB 504, and the AGP bus 521. The NB 503 includes a memory controller for controlling reading or writing of various data with respect to the MEM-P 502, a Peripheral Component Interconnect (PCI) master, and an AGP target.

The MEM-P 502 includes a ROM 502a as a memory that stores program and data for implementing various functions of the controller 510. The MEM-P 502 further includes a RAM 502b as a memory that deploys the program and data, or as a drawing memory that stores drawing data for printing. The program stored in the RAM 502b may be provided as a file in an installable format or an executable format by recording the program on a computer-readable recording medium such as a compact disc read only memory (CD-ROM), CD-R, or DVD.

The SB 504 is a bridge for connecting the NB 503 to PCI devices and peripheral devices. The ASIC 506 is an integrated circuit (IC) for image processing applications having hardware elements for image processing and has a role of a bridge connecting the AGP bus 521, the PCI bus 522, the HDD controller 508, and the MEM-C 507, respectively. The ASIC 506 includes a PCI target and an AGP master, an arbiter that arbitrates the drive timing of each signal according to a fixed priority in the ASIC 506, a memory controller that controls the MEM-C 507, rotation of image data by hardware logic, and the like. A plurality of Direct Memory Access Controllers (DMACs) for performing data transfer to and from the scanner 531 and the printer 532 through the PCI bus 522 are included. A USB interface or an Institute of Electrical and Electronics Engineers 1394 (IEEE 1394) interface may be connected to the ASIC 506.

The MEM-C 507 is a local memory used as a buffer for image data to be copied or a code buffer. The HD 509 stores various image data, font data for printing, and form data. The HDD controller 508 controls reading or writing of data to the HD 509 according to the control of the CPU 501. The AGP bus 521 is a bus interface for a graphics accelerator card which has been proposed to accelerate graphics processing. Through directly accessing the MEM-P 502 by high-throughput, speed of the graphics accelerator card is improved.

Further, the short-range communication circuit 520 includes an antenna for short-range communication circuit 520a. The short-range communication circuit 520 communicates in compliance with, for example, the NFC or the BLUETOOTH.

The engine controller 530 includes a scanner 531 and a printer 532. The control panel 540 includes a display panel 540a and an operation panel 540b. The display panel 540a is implemented by, for example, a touch panel that displays current settings or a selection screen and receives a user input. The operation panel 540b includes a numeric keypad that receives set values of various image forming parameters such as image density parameter and a start key that accepts an instruction for starting copying. The controller 510 controls entire operation of the information providing apparatus 5. For example, the controller 510 controls rendering, communication, or user input to the control panel 540. The scanner 531 or the printer 532 includes an image processing portion such as error diffusion and gamma ($\gamma$) conversion.

In response to an instruction to select a specific application through the control panel 540, for example, using a mode switch key, the information providing apparatus 5 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile function is selected.

The network I/F 550 controls communication of data with an external device through the communication network 100. The short-range communication circuit 520 and the network I/F 550 are electrically connected to the ASIC 506 through the PCI bus 522.

Any one of the above-described control programs may be recorded in a file in a format installable or executable on a computer-readable storage medium for distribution. Examples of the storage medium include, but not limited to the CD-R, DVD, BLU-RAY (registered trademark) disc, SD card, USB memory, and the like. In addition, such storage medium may be provided in a form of a program product to users within a certain country or outside that country. For example, the information providing apparatus 5 implements the information providing method according to the present disclosure by executing the program according to the present disclosure.

Figure 4:
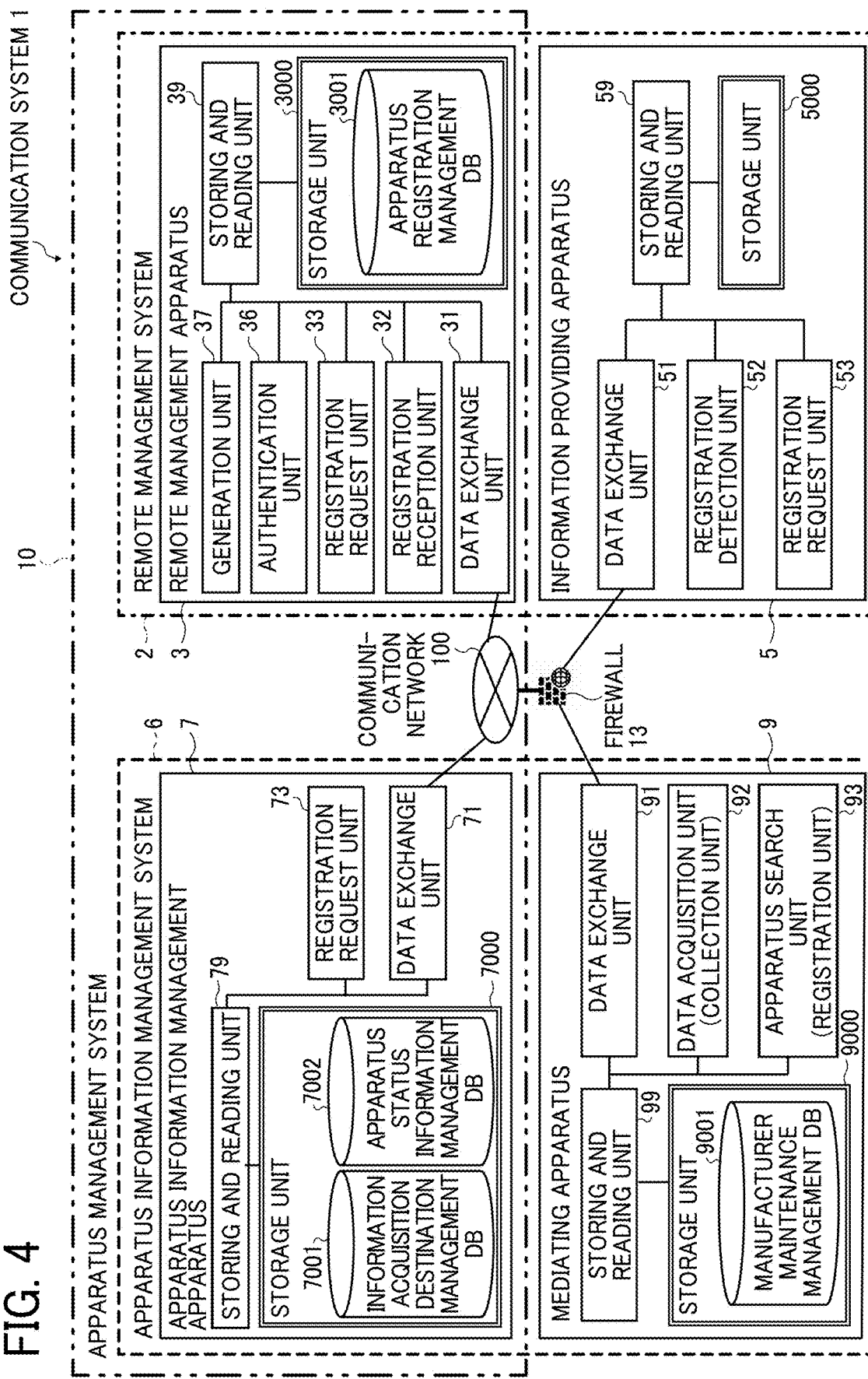
FIG. 4 is a block diagram illustrating an example of a functional configuration of the communication system according to embodiments of the present disclosure.

With reference to FIGS. 4 to 7, a functional configuration of the present embodiment is described. FIG. 4 is a block diagram illustrating an example of the functional configuration of the communication system according to the present embodiment.

As illustrated in FIG. 4, the remote management apparatus 3 includes a data exchange unit 31, a registration reception unit 32, a registration request unit 33, an authentication unit 36, a generation unit 37, and a storing and reading unit 39. Each of these functional units is implemented by an instruction from the CPU 301 according to a program for the remote management apparatus 3 deployed in the RAM 303 from at least one of the ROM 302 and the HD 304, to any of the components illustrated in FIG. 2. The remote management apparatus 3 further includes a storage unit 3000, which is implemented by the ROM 302 or the HD 304 illustrated in FIG. 2.

FIG. 5 is a diagram illustrating an example of an apparatus registration management table according to the present embodiment. In the storage unit 3000, an apparatus registration management database (DB) 3001 storing the apparatus registration management table as illustrated in FIG. 5 is implemented. In the apparatus registration management table, an apparatus registration reception code, registration status, and apparatus identification information are stored in association with each other.

The apparatus identification information is a number with a certain order, and is a number, symbol, or code having a fixed number of digits assigned at the time of manufacturing the information providing apparatus 5.

The apparatus registration reception code includes a plurality of alphabetic characters, codes, symbols, numbers, and the like generated inside the remote management apparatus 3. The apparatus registration reception code is assigned as information (such as a CD-Key) that has a relatively large number of digits and is not in order and cannot be easily imitated. The examples of the apparatus registration reception codes are "23kjhkjhd124lkd" and "kk10cnn17bhxjc". By doing so, the remote management apparatus 3 can reject a registration request by a code other than the generated apparatus registration reception code.

The registration status indicates a registration state of the information providing apparatus 5, and initial value is "null" or "empty". The registration status is changed to "accepted" when the generated apparatus registration reception code is passed to the information providing apparatus 5 and is changed to "registered" when the registration of the information providing apparatus 5 is completed.

The functional configuration of the remote management apparatus 3 is described in detail. The data exchange unit 31 of the remote management apparatus 3 illustrated in FIG. 4 is implemented mainly by processing of the CPU 301, the external device connection I/F 307, and the network I/F 309 illustrated in FIG. 2 and transmits and receives various data (or information) to and from the apparatus information management apparatus 7 through the communication network 100. Further, the data exchange unit 31 transmits and receives various data (or information) to and from the information providing apparatus 5 through the communication network 100 and the firewall 13.

The registration reception unit 32 is mainly implemented by the processing of the CPU 301 illustrated in FIG. 2 and receives the apparatus identification information transmitted from the apparatus information management apparatus 7 to receive the registration.

The registration request unit 33 is mainly implemented by the processing of the CPU 301 illustrated in FIG. 2 and provides an application programming interface (API) for confirming whether there is an apparatus registration request.

The authentication unit 36 is mainly implemented by the processing of the CPU 301 illustrated in FIG. 2 and authenticates the remote management apparatus 3 in order to check whether the apparatus is spoofed or the like. For this authentication, a known method such as a transport layer security (TLS) security certificate or API key is used.

The generation unit 37 is mainly implemented by the processing of the CPU 301 illustrated in FIG. 2 and generates the apparatus registration reception code and controls the storing and reading unit 39 to write the generated apparatus registration reception code to the apparatus registration management table stored in the apparatus registration management DB 3001 illustrated in FIG. 5.

The storing and reading unit 39, which is mainly implemented by the processing of the CPU 301 illustrated in FIG. 2, stores various data (or information) in the storage unit 3000 or reads various data (or information) from the storage unit 3000.

As illustrated in FIG. 4, the information providing apparatus 5 includes a data exchange unit 51, a registration detection unit 52, a registration request unit 53, and a storing and reading unit 59. Each of these functional units is implemented by the instruction from the CPU 501 according to a program for the information providing apparatus 5 expanded in the RAM 502b from at least one of the ROM 502a and the HD 509 to any of the components illustrated in FIG. 3.

A functional configuration of the information providing apparatus 5 is described in detail. The data exchange unit 51 of the information providing apparatus 5 illustrated in FIG. 4 is mainly implemented by the processing of the CPU 501, the short-range communication circuit 520, and the network I/F 550 illustrated in FIG. 3 and transmits and receives various data (or information) to and from the remote management apparatus 3 through the firewall 13 and the communication network 100. Further, the data exchange unit 51 transmits and receives various data (or information) to and from the mediating apparatus 9 through the firewall 13.

The registration detection unit 52 is mainly implemented by the processing of the CPU 501 illustrated in FIG. 3 and confirms whether the registration detection unit 52 has received the apparatus registration request at regular intervals.

The registration request unit 53 is mainly implemented by the processing of the CPU 501 illustrated in FIG. 3 and requests the remote management apparatus 3 to register the apparatus according to the instruction from the registration detection unit 52.

The storing and reading unit 59, which is mainly implemented by the processing of the CPU 501 illustrated in FIG. 3, stores various data (or information) in the storage unit 5000 or reads various data (or information) from the storage unit 5000.

As illustrated in FIG. 4, the apparatus information management apparatus 7 includes a data exchange unit 71, a registration request unit 73, and a storing and reading unit 79. Each of these functional units is implemented by the instruction from the CPU 701 according to a program for the apparatus information management apparatus 7 expanded in the RAM 703 from at least one of the ROM 702 and the HD 704 to any of the components illustrated in FIG. 2. The apparatus information management apparatus 7 further includes a storage unit 7000 implemented by the ROM 702 or the HD 704 illustrated in FIG. 2.

FIG. 6A is a diagram illustrating an example of an information acquisition destination management table according to the present embodiment. In the storage unit 7000, an information acquisition destination management DB 7001 storing the information acquisition destination management table as illustrated in FIG. 6A is implemented. In the information acquisition destination management table, an information acquisition destination corresponding to the apparatus identification information is stored in association with each other. The information acquisition destination indicates a destination for acquiring information of the information providing apparatus corresponding to the apparatus identification information, that is, a place, a destination, etc. from which the information of the information providing apparatus is acquired, for example, "https://system A/", "https://system B/", etc.

FIG. 6B is a diagram illustrating an example of an apparatus status information management table according to the present embodiment. The apparatus status information management table as illustrated in FIG. 6B is stored in an apparatus status information management DB 7002 implemented in the storage unit 7000. The apparatus status information management table includes apparatus status information A (parts usage) and apparatus status information B (parts serial number) stored in association with the apparatus identification information.

The apparatus status information A (parts usage) includes, for example, a toner remaining level (a number from 10 to 0) indicating consumables information in the information providing apparatus 5, toner replacement date (year, month, and date), and parts information indicating the number of times a particular part is used. Further, in the apparatus status information B (parts serial number), for example, consumables identification number (serial number) of parts, consumables, and the like used in the information providing apparatus is stored. In other words, in the apparatus status information management table, various information (dealer, customer information, apparatus information (parts, firmware, counter, status such as error status, setting value, etc.)) for providing a solution related to managed print service are stored.

A functional configuration of the apparatus information management apparatus 7 is described in detail. The data exchange unit 71 of the apparatus information management apparatus 7 illustrated in FIG. 4 is implemented mainly by the processing of the CPU 701, the external device connection I/F 707, and the network I/F 709 illustrated in FIG. 2, and various data (or information) are transmitted and received to and from the remote management apparatus 3 through the communication network 100. Further, the data exchange unit 71 transmits and receives various data (or information) to and from the mediating apparatus 9 through the communication network 100 and the firewall 13.

The registration request unit 73 is mainly implemented by the processing of the CPU 701 illustrated in FIG. 2 and receives the apparatus identification information to be registered from the mediating apparatus 9 and request the remote management apparatus 3 to register the apparatus through the registration reception unit 32 (API) of the remote management apparatus 3.

The storing and reading unit 79, which is mainly implemented by processing of the CPU 701 illustrated in FIG. 2, stores various data (or information) in the storage unit 7000 or reads various data (or information) from the storage unit 7000.

As illustrated in FIG. 4, the mediating apparatus 9 includes a data exchange unit 91, a data acquisition unit (collection unit) 92, an apparatus search unit (registration unit) 93, and a storing and reading unit 99. Each of these functional units is implemented by the instruction from the CPU 901 according to a program for the mediating apparatus 9 expanded in the RAM 903 from at least one of the ROM 902 and the HD 904 to any of the components illustrated in FIG. 2. The mediating apparatus 9 further includes a storage unit 9000 implemented by the ROM 902 or the HD 904 illustrated in FIG. 2.

FIG. 7 is a diagram illustrating an example of a manufacturer maintenance management table according to the present embodiment. In the storage unit 9000, a manufacturer maintenance management DB 9001 storing the manufacturer maintenance management table as illustrated in FIG. 7 is implemented. In the manufacturer maintenance management table, management items including an Internet Protocol (IP) address, last collection date and time, and cache data are stored in association with the corresponding apparatus identification information.

The IP address corresponds to the apparatus identification information of the information providing apparatus to which the apparatus identification information is assigned. The last collection date and time indicates when the status information or the like related to the information providing apparatus to which the apparatus identification information is assigned was last collected.

The cache data is information on the information providing apparatus (information on the apparatus status information A and the apparatus status information B, described below). For example, when the information providing apparatus 5 is powered down and real-time information cannot be acquired, the cache data acquired from the information providing apparatus 5 can be used. The cache data is stored in this table as alternative information for the real-time information. JavaScript Object Notation (JSON) format, Extensible Markup Language (XML) format, or the like can be used for this table. For example, a set of JSON format key and value such as {"apparatus status information A": "xxx", "apparatus status information B": "yyy",} may be used to store information in this table.

A functional configuration of the mediating apparatus 9 is described below in detail. The data exchange unit 91 of the mediating apparatus 9 illustrated in FIG. 4 is implemented mainly by the processing of the CPU 901, the external device connection I/F 907, and the network I/F 909 illustrated in FIG. 2, and various data (or information) are transmitted and received to and from the information providing apparatus 5 through the firewall 13. Further, the data exchange unit 91 transmits and receives various data (or information) to and from the apparatus information management apparatus 7 through the firewall 13 and the communication network 100.

The data acquisition unit (collection unit) 92 is mainly implemented by the processing of the CPU 901 illustrated in FIG. 2 and collects data from the information providing apparatus 5 installed in the customer LAN 11. Further, the data acquisition unit (collection unit) 92 receives the status information of the information providing apparatus 5 from the information providing apparatus 5, transfers the status information to the apparatus information management apparatus 7, changes the set value, updates the firmware, and the like.

The apparatus search unit (registration unit) 93 is mainly implemented by the processing of the CPU 901 illustrated in FIG. 2, and searches for an information providing apparatus residing in the customer LAN 11 in response to installation in the customer LAN 11. The apparatus search unit (registration unit) 93 assumes that searching for the apparatus is successful in response to the acquisition of the apparatus identification information.

The storing and reading unit 99, which is mainly implemented by the processing of the CPU 901 illustrated in FIG. 2, stores various data (or information) in the storage unit 9000 or reads various data (or information) from the storage unit 9000.

Figure 8:
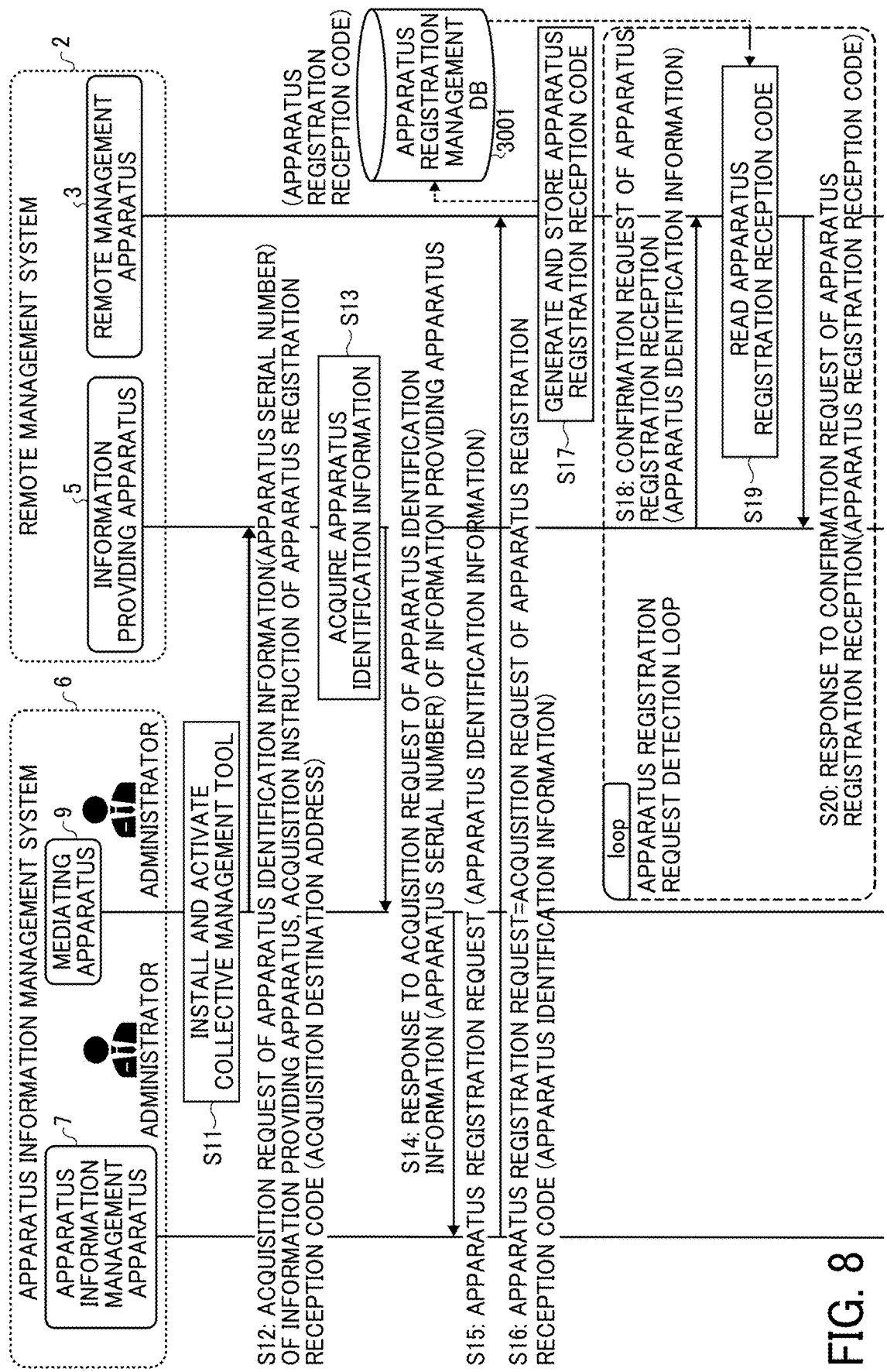
FIG. 8 is a sequence diagram illustrating an example of an apparatus registration process according to a first embodiment of the present disclosure.
Figure 9:
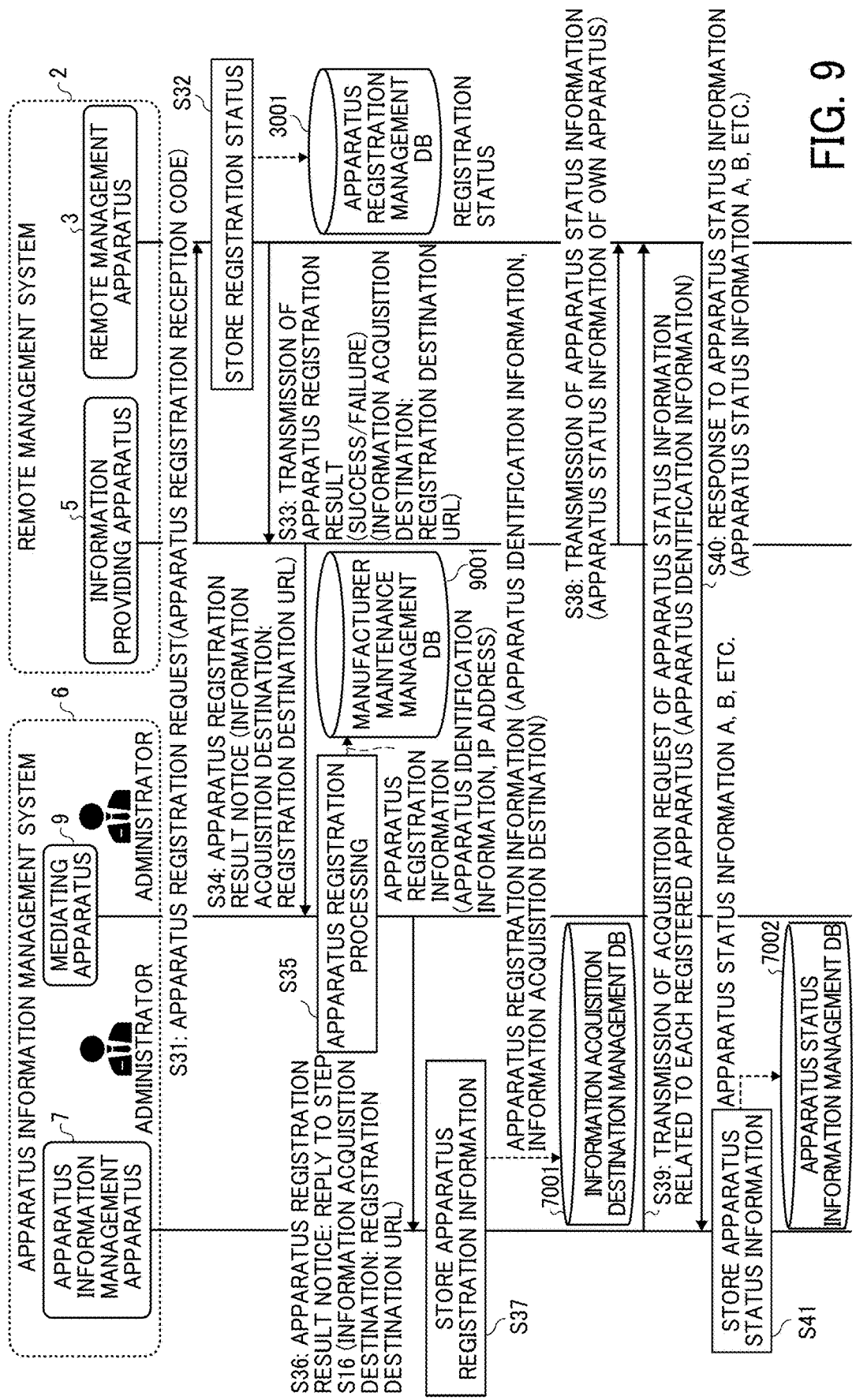
FIG. 9 is a sequence diagram illustrating an example of an apparatus status information acquisition process according to the first embodiment of the present disclosure.

With reference to FIGS. 8 and 9, processes or operations in the communication system 1 according to the first embodiment is described. Examples of main processes according to the first embodiment are described below.

1. The information providing apparatus 5 performs polling communication with the remote management apparatus 3 to perform apparatus registration and opening processing.

2. The apparatus information management system 6 acquires apparatus identification information of the information providing apparatus 5 used by an on-site customer.

3. The apparatus information management system 6 requests the remote management apparatus 3 to register the apparatus by designating the apparatus identification information and the dealer code.

4. The information providing apparatus 5 periodically performs polling communication with the remote management apparatus 3 (Ricoh Smart Integration (RSI) Data Hub) to detect the apparatus registration request.

5. The information providing apparatus 5 performs apparatus registration and opening processing for the remote management apparatus 3.

FIG. 8 is a sequence diagram illustrating an example of the apparatus registration process according to the first embodiment. In step S11, a customer engineer or the like visits the customer and installs a collective management tool on a server and the data acquisition unit (collection unit) 92 of the mediating apparatus 9 activates the collective management tool as illustrated in FIG. 8.

Subsequently, the apparatus search unit (registration unit) 93 searches for the information providing apparatus 5 installed in the customer LAN 11. The apparatus search unit (registration unit) 93 may start polling communication for searching the apparatus for registration during the search communication. Further, the apparatus search unit (registration unit) 93 may be able to adjust the polling communication cycle according to customer's network policy.

In step S12, the data acquisition unit (collection unit) 92, for example, collects data from the information providing apparatus 5 installed in the customer LAN 11 through the data exchange unit 91. Specifically, the data acquisition unit (collection unit) 92 controls the data exchange unit 91 to request the information providing apparatus 5 to acquire the apparatus identification information of the information providing apparatus 5 and the apparatus registration reception code. Accordingly, the data exchange unit 51 of the information providing apparatus 5 receives the apparatus identification information acquisition request of the information providing apparatus 5 and the apparatus registration reception code acquisition instruction transmitted from the mediating apparatus 9.

In step S13, the information providing apparatus 5 acquires the apparatus identification information and stores the acquired apparatus identification information in the storage unit 5000.

In step S14, the data exchange unit 51 transmits the acquired apparatus identification information to the mediating apparatus 9. Accordingly, the data exchange unit 91 of the mediating apparatus 9 receives the apparatus identification information transmitted from the information providing apparatus 5.

In step S15, the data exchange unit 91 of the mediating apparatus 9 that has received the apparatus identification information transmits the apparatus registration request to the apparatus information management apparatus 7. Accordingly, the data exchange unit 71 of the apparatus information management apparatus 7 receives the apparatus registration request transmitted from the mediating apparatus 9. The apparatus registration request includes the apparatus identification information of the information providing apparatus 5.

In step S16, in order to acquire the apparatus registration reception code, the registration request unit 73 of the apparatus information management apparatus 7 controls the data exchange unit 71 through the registration request unit 73 (API) to transmit the apparatus registration request to the remote management apparatus 3. Accordingly, the data exchange unit 31 of the remote management apparatus 3 receives the apparatus registration request transmitted from the apparatus information management apparatus 7. The apparatus registration request includes the apparatus identification information of the information providing apparatus 5. Further, the registration request unit 33 provides the API for confirming whether there is the apparatus registration request.

The reason for performing the above-mentioned processes from step S14 to step S16 is as follows. In order to register the apparatus by communication between the information providing apparatus 5 and the remote management apparatus 3, it is necessary to implement a function equivalent to the function executed in step S16 on the information providing apparatus 5. However, when the information providing apparatus 5 is an old model or the like, it is often the case that the function executed in step S16 is not implemented, and it takes an enormous number of man-hours to add the function, or the function cannot be added. Therefore, the apparatus information management system 6 centrally registers the information providing apparatus 5.

In step S17, the generation unit 37 of the remote management apparatus 3 that has received the apparatus registration request generates the apparatus registration reception code corresponding to the received apparatus identification information and controls the storing and reading unit 39 to write the generated apparatus registration reception code in the apparatus registration management table stored in the apparatus registration management DB 3001 illustrated in FIG. 5. In order to prevent spoofing and the like, the generation unit 37 generates irregular code such as "23kjhkjhd124lkd" or "kk10cnn17bhxjce" which are not easily imitated as the apparatus registration reception code.

The generation unit 37 may be included in the information providing apparatus 5 or another apparatus provided between the remote management apparatus 3 and the information providing apparatus 5 instead of included in the remote management apparatus 3.

In step S18, the registration detection unit 52 of the information providing apparatus 5 confirms whether there is a confirmation request for the apparatus registration reception at regular intervals. Specifically, the data exchange unit 51 transmits the confirmation request for the apparatus registration reception to the remote management apparatus 3 while the loop process for the confirmation request for the apparatus registration reception is being performed. Accordingly, the data exchange unit 31 of the remote management apparatus 3 receives the confirmation request for the apparatus registration reception transmitted from the information providing apparatus 5. The apparatus identification information is included in the confirmation request of the apparatus registration reception.

In step S19, the storing and reading unit 39 of the remote management apparatus 3 that has received the confirmation request of the apparatus registration reception transmitted from the information providing apparatus 5, searches the apparatus registration management table stored in the apparatus registration management DB 3001 illustrated in FIG. 5 using the received apparatus identification information as a search key, and reads the corresponding apparatus registration reception code. In step S20, the data exchange unit 31 transmits the apparatus registration reception code to the information providing apparatus 5 as a confirmation response of the apparatus registration reception. Accordingly, the data exchange unit 51 of the information providing apparatus 5 receives the confirmation response of the apparatus registration reception transmitted from the remote management apparatus 3. The apparatus registration reception code is included in the confirmation response of the apparatus registration reception. After step S20 is executed, the storing and reading unit 39 changes the registration status in the apparatus registration management table stored in the apparatus registration management DB 3001 illustrated in FIG. 5 to "registered".

In the above-mentioned processes from step S18 to step S20 executed by the remote management system 2, a loop processing (polling processing) of a certain interval is performed starting from, for example, the acquisition instruction of the apparatus registration reception code transmitted from the mediating apparatus 9 in step S12, and between the remote management apparatus 3 and the information providing apparatus 5 that provided the apparatus identification information to the remote management apparatus 3.

The sequence diagram illustrated in FIG. 9 is described below. FIG. 9 is a sequence diagram illustrating an example of an apparatus status information acquisition process according to the first embodiment.

In step S31, the registration request unit 53 of the information providing apparatus 5 requests the remote management apparatus 3 to register the apparatus in response to an instruction from the registration detection unit 52. Specifically, the registration request unit 53 controls the data exchange unit 51 to transmit the apparatus registration request to the remote management apparatus 3. Accordingly, the data exchange unit 31 of the remote management apparatus 3 receives the apparatus registration request transmitted from the information providing apparatus 5. The apparatus registration request includes the apparatus registration reception code received in step S20. The reason for using the apparatus registration reception code when requesting the apparatus registration is to prevent spoofing that may occur by using regular information such as the apparatus identification information. Therefore, in step S31, the authentication unit 36 checks whether there is spoofing by the apparatus registration reception code included in the received apparatus registration request. Step S31 may be performed, for example, at a fixed time after receiving the apparatus registration reception code in step S20. Further, step S31 may be performed immediately after the execution of step S20 or may be performed at the time of periodic processing or nighttime processing.

In step S32, the storing and reading unit 39 of the remote management apparatus 3 writes the registration status of the information providing apparatus 5 corresponding to the apparatus registration reception code received from the information providing apparatus 5 on the apparatus registration management table stored in the apparatus registration management DB 3001 illustrated in FIG. 5. The registration status (for example, "accepted", "registered", etc.) written at this time changes depending on the processing content. The remote management apparatus 3 may be able to respond to the registration result in response to the request from the apparatus information management apparatus 7 by writing the registration status.

In step S33, the data exchange unit 31 transmits apparatus registration result information indicating whether the apparatus registration is successful to the information providing apparatus 5. Accordingly, the data exchange unit 51 of the information providing apparatus 5 receives the apparatus registration result information transmitted from the remote management apparatus 3. In the process of step S33, when the registration of the information providing apparatus 5 in the remote management apparatus 3 is successful, the data exchange unit 31 of the remote management apparatus 3 transmits a universal resource locator (URL) as the information acquisition destination to the information providing apparatus 5. Accordingly, the data exchange unit 51 of the information providing apparatus 5 receives the URL as the information acquisition destination transmitted from the remote management apparatus 3. The URL as the information acquisition destination in this case is the address of the remote management apparatus 3. As for the information acquisition destination, the remote management apparatus 3 is usually the information acquisition destination. On the other hand, when the information of the information providing apparatus 5 is collected by the distributed processing and the information is provided to the apparatus information management apparatus 7, the information acquisition destination may include a plurality of servers. In such a case, since the server corresponding to the information providing apparatus 5 is different, the data exchange unit 31 of the remote management apparatus 3 notifies the information providing apparatus 5 of the server address, and the information providing apparatus 5 may notify the apparatus information management apparatus 7 of the address and the apparatus information management apparatus 7 may store the address.

The information registration destination of the information providing apparatus 5 is the apparatus information management apparatus 7, but the information acquisition destination is not necessarily the apparatus information management apparatus 7. For example, when there is a subsystem connected to the apparatus information management apparatus 7 for load balancing, the apparatus information management apparatus 7 collectively registers the information, but the transmission destination to which the information providing apparatus 5 transmits the apparatus status information and the acquisition destination from which the apparatus information management apparatus 7 acquires the apparatus status information may be the subsystem. In this case, when registering the information providing apparatus 5 in the remote management apparatus 3 in step S32, the remote management apparatus 3 may determine the subsystem and transmit the address (URL of the registration destination) of the subsystem to the information providing apparatus 5 in step S33. In this way, the information providing apparatus 5 identifies the subsystem based on the registered URL and transmits the apparatus status information to the apparatus information management apparatus 7, and the apparatus information management apparatus 7 identifies the subsystem based on the registered URL and acquires the apparatus status information.

Returning to the sequence diagram, the storing and reading unit 39 changes the registration status in the apparatus registration management table stored in the apparatus registration management DB 3001 illustrated in FIG. 5 to "registered".

In step S34, the data exchange unit 51 of the information providing apparatus 5 transmits the apparatus registration result notice to the mediating apparatus 9. Accordingly, the data acquisition unit (collection unit) 92 of the mediating apparatus 9 controls the data exchange unit 91 to receive the apparatus registration result notice transmitted from the information providing apparatus 5. The apparatus registration result notice includes the URL of the registration destination system. In connection with the process of step S34, the data exchange unit 51 may notify the information acquisition destination (URL of the registration destination, etc.) to the mediating apparatus 9 at the start of the polling process from step S18 to step S20 described above.

Further, when communication is performed from the remote management apparatus 3 (remote management system 2) to the mediating apparatus 9 (apparatus information management system 6), the data exchange unit 31 may separate the apparatus search communication, but the number of communications can be reduced by combining the communication with the polling process. Further, since communication of the notice is not always successful, the number of retransmissions may be set.

In step S35, as the apparatus registration process, the storing and reading unit 99 of the mediating apparatus 9 writes on the manufacturer maintenance management table stored in the manufacturer maintenance management DB 9001 illustrated in FIG. 7, the last collection date and time and cache data ("apparatus status information A": "xxx", "apparatus status information B": "yyy", etc.) corresponding to the apparatus identification information and the IP address. In step S35, the notified URL of the registration destination is associated with the apparatus identification information and stored in the manufacturer maintenance management table stored in the manufacturer maintenance management DB 9001 illustrated in FIG. 7. Further, when the registration of the information providing apparatus 5 fails for some reason, the apparatus main body is given as the information acquisition destination because the information cannot be acquired from the remote management apparatus 3.

In step S36, after writing the apparatus registration information, the data exchange unit 91 transmits the apparatus registration result notice to the apparatus information management apparatus 7. Accordingly, the data exchange unit 71 of the apparatus information management apparatus 7 receives the apparatus registration result notice transmitted from the mediating apparatus 9.

In step S37, the storing and reading unit 79 writes the received apparatus registration information as an information acquisition destination corresponding to the apparatus identification information in the information acquisition destination management table stored in the information acquisition destination management DB 7001 illustrated in FIG. 6A. The information acquisition destination is, for example, "https://system A/". When the registration of the information providing apparatus 5 fails for some reason, the apparatus information management apparatus 7 cannot acquire information from the remote management apparatus 3, so the apparatus main body is stored as the information acquisition destination.

In step S38, the data exchange unit 51 of the information providing apparatus 5 transmits the apparatus status information to the remote management apparatus 3. Accordingly, the data exchange unit 31 of the remote management apparatus 3 receives the apparatus status information transmitted from the information providing apparatus 5. The apparatus status information includes the apparatus status information A, apparatus status information B, and the like of the information providing apparatus 5, and the storing and reading unit 39 may store the received apparatus status information in the storage unit 3000. Further, when the information providing apparatus 5 periodically transmits its own apparatus status information as in the process of step S38 described above, the destination is identified based on the URL of the registration destination (information acquisition destination) as described in the process of step S33. The transmission of the apparatus status information performed in step S38 is periodically performed by the information providing apparatus 5 based on the address information held by the remote management apparatus 3. The transmission of the apparatus status information is not always executed at the time of step S38.

In step S39, the data exchange unit 71 transmits to the remote management apparatus 3, an apparatus status information acquisition request for acquiring the apparatus status information related to each registered apparatus. Accordingly, the data exchange unit 31 of the remote management apparatus 3 receives the apparatus status information acquisition request for acquiring the apparatus status information related to each registered apparatus transmitted from the apparatus information management apparatus 7. The apparatus status information acquisition request includes the apparatus identification information. In the present embodiment, since the address (URL) of the remote management apparatus 3 transmitted from the remote management apparatus 3 in step S33 is the information acquisition destination, the data exchange unit 71 transmits the apparatus status information acquisition request to the remote management apparatus 3.

In step S40, in response to the apparatus status information acquisition request, the data exchange unit 31 of the remote management apparatus 3 transmits the apparatus status information of the information providing apparatus 5 acquired in step S38 to the apparatus information management apparatus 7 for each registered apparatus. Accordingly, the data exchange unit 71 of the apparatus information management apparatus 7 receives the apparatus status information transmitted from the remote management apparatus 3. The apparatus status information includes the apparatus status information A, the apparatus status information B, and the like.

In step S41, the storing and reading unit 79 of the apparatus information management apparatus 7 that has received the apparatus status information writes the apparatus status information (apparatus status information A, apparatus status information B, and the like) corresponding to the apparatus identification information assigned to the specific information providing apparatus 5 in the apparatus status information management table stored in the apparatus status information management DB 7002 illustrated in FIG. 6B. The apparatus status information written here includes parts information of parts mounted on the specific information providing apparatus 5 corresponding to the specific apparatus registration reception code, the remaining number of consumables used in the information providing apparatus 5, the replacement date and time, consumable information including identification number, and usage status and identification number of a particular part. Specifically, in the case of apparatus status information A (parts usage), for example, items such as the toner remaining level (a number from 0 to 10) in the information providing apparatus 5, the toner replacement date and time (year, month, and date), and the number of times the particular part has been used. Further, in the case of apparatus status information B (parts serial number), for example, items such as an identification number (serial number) of parts and consumables used in the information providing apparatus are included. In the processing of steps S39 to S41 described above, in response to receiving the apparatus status information from the remote management apparatus 3, the storing and reading unit 79 acquires the apparatus status information from the information providing apparatus 5 through the mediating apparatus 9 and may store the apparatus status information in the apparatus status information management table stored in the apparatus status information management DB 7002 illustrated in FIG. 6B.

The apparatus registration reception code described above may be acquired directly from the remote management apparatus 3 by the information providing apparatus 5 or may be acquired from the remote management apparatus 3 by the information providing apparatus 5 through the apparatus information management apparatus 7.

As described above, according to the first embodiment, the data exchange unit 31 of the remote management apparatus 3 receives the apparatus registration request transmitted by the apparatus information management apparatus 7 (step S16), and as a response, the URL as the information acquisition destination is transmitted to the information providing apparatus 5 (step S33). The data exchange unit 71 of the apparatus information management apparatus 7 that has received the URL as the information acquisition destination registers the URL as the information acquisition destination. After that, the data exchange unit 31 of the remote management apparatus 3 receives the apparatus status information acquisition request for acquiring the apparatus status information related to each registered apparatus transmitted by the apparatus information management apparatus 7 (step S39). In response to the apparatus status information acquisition request, the apparatus status information of the information providing apparatus 5 acquired in step S38 is transmitted to the apparatus information management apparatus 7 (step S40). Accordingly, the remote management apparatus 3 transmits the information acquisition destination information and the apparatus status information of the information providing apparatus 5 managed by the remote management apparatus 3 to the apparatus information management apparatus 7. The apparatus information management apparatus 7 can access the information acquisition destination of the information providing apparatus 5 to be newly managed and store the apparatus status information of the information providing apparatus 5. Therefore, it is possible to reduce complicated settings by the mediating apparatus for individually registering the apparatus of each manufacturer and performing various settings for the remote management apparatus.

Further, in addition to simplifying registration when installing the information providing apparatus 5, the information provided to the apparatus information management apparatus 7 can be increased according to the level of other companies in the path between the remote management apparatus 3 and the information providing apparatus 5.

Figure 10:
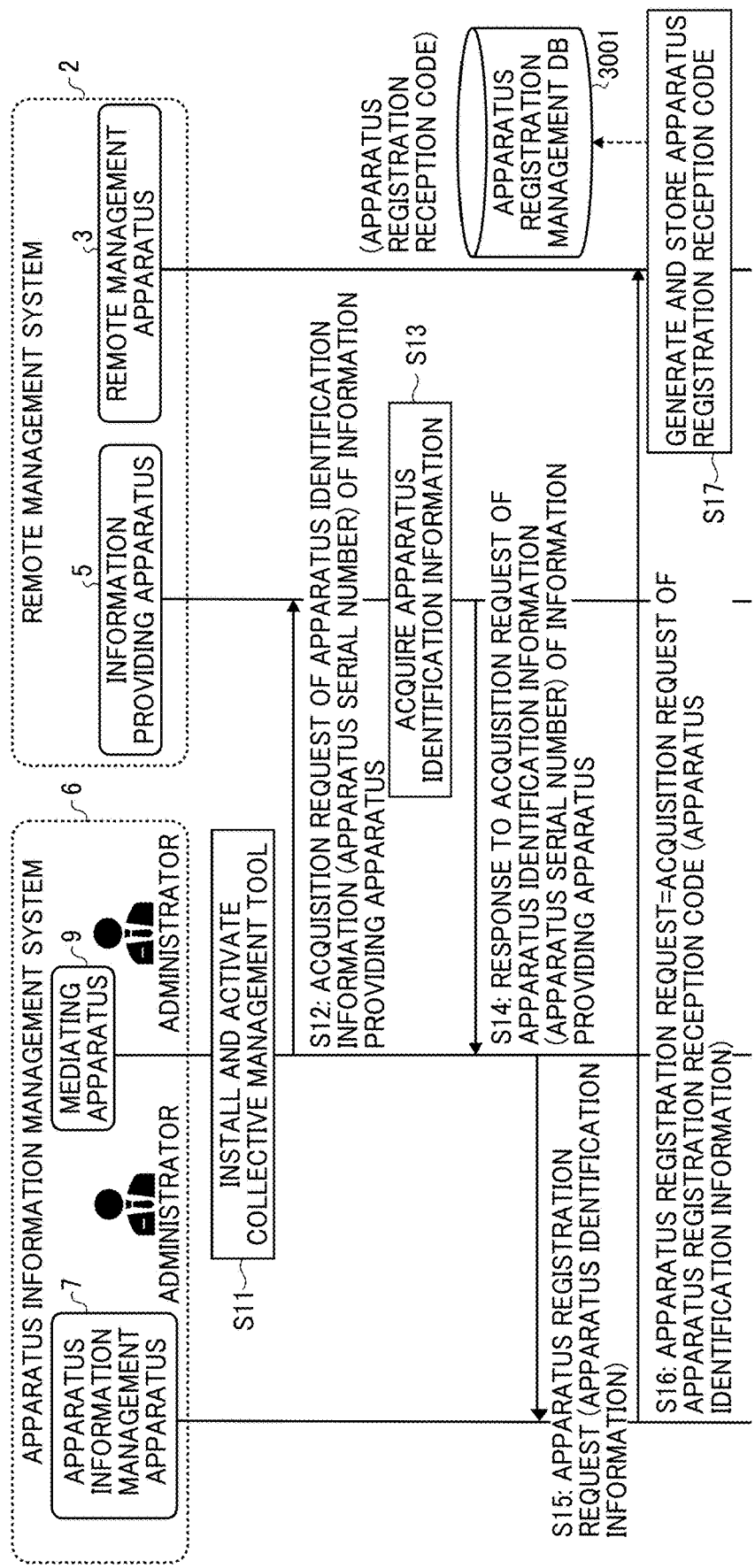
FIG. 10 is a sequence diagram illustrating an example of the apparatus registration process according to a second embodiment of the present disclosure.
Figure 11:
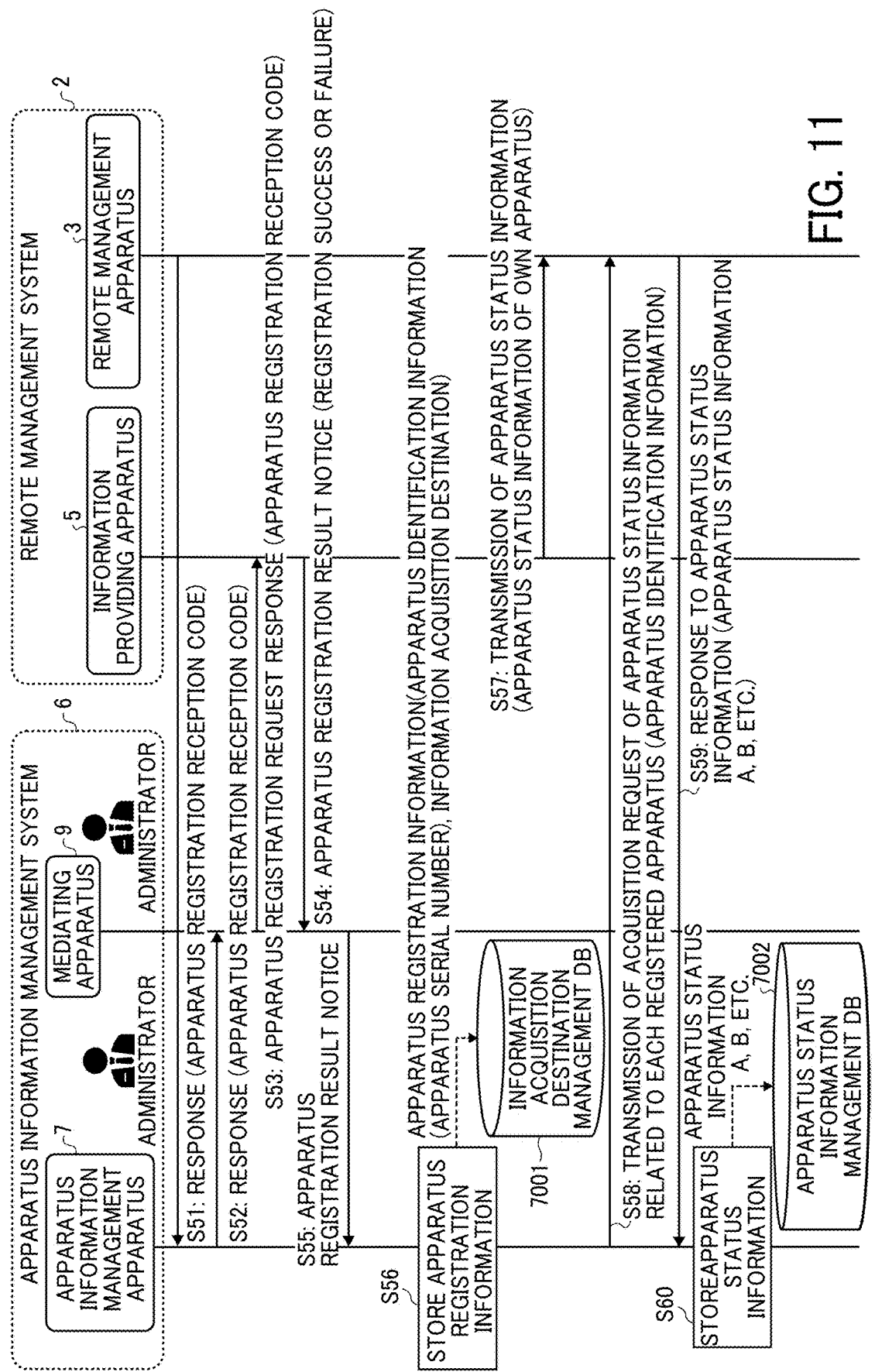
FIG. 11 is a sequence diagram illustrating an example of the apparatus status information acquisition process according to the second embodiment of the present disclosure.

With reference to FIGS. 10 and 11, a second embodiment is described below. Also, in the second embodiment, since the system configuration, the hardware configuration, and the functional configuration used in the first embodiment are the same, detailed description thereof is omitted. As described below, the difference from the first embodiment is the process of step S52, in which the data exchange unit 71 of the apparatus information management apparatus 7 that has received the apparatus registration reception code from the remote management apparatus 3 transmits the received apparatus registration reception code to the mediating apparatus 9. Using this information, the apparatus registration request is made directly from the mediating apparatus 9 to the information providing apparatus 5. By doing so, unnecessary communication from the information providing apparatus 5 to the communication network 100 does not occur, and the customer does not need to change the settings for the firewall 13. Further, by communicating from the apparatus information management apparatus 7 to the mediating apparatus 9 as in steps S52 and S53, it is not necessary for the mediating apparatus 9 to have a server function.

The following are examples of the main processes in the second embodiment.

1. The web API of the information providing apparatus 5 is called from the on-site software of the solution related to the managed print service.

2. The apparatus information management system 6 acquires the apparatus identification information (serial number) of the information providing apparatus 5 used by the on-site customer.

3. The apparatus information management system 6 designates the apparatus identification information and the dealer code to acquire the registration number required for apparatus registration for the remote management apparatus 3.

4. The apparatus information management system 6 refers to the information providing apparatus 5 and call the API by designating the registration number obtained in 3.

5. The information providing apparatus 5 performs apparatus registration and opening of communication with the remote management apparatus 3.

FIG. 10 is a sequence diagram illustrating an example of the apparatus registration process according to the second embodiment. In the second embodiment, the processes from steps S11 to S17 are the same as the steps in the first embodiment, and thus the description thereof is omitted. In step S12, the mediating apparatus 9 does not send the apparatus registration reception code acquisition instruction to the information providing apparatus 5 because the polling process is not performed by the remote management system 2.

The sequence diagram illustrated in FIG. 11 is described below. FIG. 11 is a sequence diagram illustrating an example of the apparatus status information acquisition process according to the second embodiment of the present disclosure.

In step S51, the data exchange unit 31 of the remote management apparatus 3 transmits a response including the apparatus registration reception code to the apparatus information management apparatus 7 as a response to the apparatus registration request in step S16. Accordingly, the data exchange unit 71 of the apparatus information management apparatus 7 receives the response including the apparatus registration reception code transmitted from the remote management apparatus 3.

In step S52, the data exchange unit 71 of the apparatus information management apparatus 7 transmits a response including the apparatus registration reception code to the mediating apparatus 9. Accordingly, the data exchange unit 91 of the mediating apparatus 9 receives the response including the apparatus registration reception code transmitted from the apparatus information management apparatus 7.

In step S53, the data exchange unit 91 of the mediating apparatus 9 transmits an apparatus registration request to the information providing apparatus 5. Accordingly, the data exchange unit 51 of the information providing apparatus 5 receives the apparatus registration request transmitted from the mediating apparatus 9. The apparatus registration reception code is included in the apparatus registration request.

The above-mentioned processes from step S51 to step S53 (particularly, the process of step S52) are different from the first embodiment. That is, in response to the apparatus registration request (step S16) transmitted from the apparatus information management apparatus 7 to the remote management apparatus 3, the remote management apparatus 3 sends the apparatus registration reception code to the apparatus information management apparatus 7 in step S51. The mediating apparatus 9 receives the apparatus registration reception code from the apparatus information management apparatus 7 and transmits the apparatus registration request directly to the information providing apparatus 5. As a result, need for communication from the information providing apparatus 5 to the communication network 100 is eliminated, changing the firewall settings and the like for the customer who uses the information providing apparatus 5 is not necessary, and introduction to various customer networks is facilitated.

In step S54, after receiving the apparatus registration request, the data exchange unit 51 transmits the apparatus registration result notice including the success or failure of the apparatus registration to the mediating apparatus 9. Accordingly, the data exchange unit 91 of the mediating apparatus 9 receives the apparatus registration result notice including the success or failure of the apparatus registration transmitted from the information providing apparatus 5.

Similar to steps S55 and S36, the data exchange unit 91 of the mediating apparatus 9 transmits the apparatus registration result notice to the apparatus information management apparatus 7. Accordingly, the data exchange unit 71 of the apparatus information management apparatus 7 receives the apparatus registration result notice transmitted from the mediating apparatus 9.

Similar to steps S56 and S37, after receiving the apparatus registration result notice, the storing and reading unit 79 writes the apparatus registration information in the information acquisition destination management table stored in the information acquisition destination management DB 7001 illustrated in FIG. 6A. The apparatus registration information includes the apparatus identification information and the information acquisition destination.

Similar to steps S57 and S38, the data exchange unit 51 of the information providing apparatus 5 transmits the apparatus status information of the own apparatus to the remote management apparatus 3. Accordingly, the data exchange unit 31 of the remote management apparatus 3 receives the apparatus status information of the information providing apparatus 5 transmitted from the information providing apparatus 5. Further, the storing and reading unit 39 may store the received apparatus status information in the storage unit 3000. The process of step S57 is periodically performed by the information providing apparatus 5 based on the address information held by the remote management apparatus 3, as in step S38. The transmission of the apparatus status information is not always executed at the time of step S57.

As same as step S58 and step S39, after writing the apparatus registration information in step S56, the data exchange unit 71 of the apparatus information management apparatus 7 transmits to the remote management apparatus 3, a request for acquiring the apparatus status information related to each registered apparatus. Accordingly, the data exchange unit 31 of the remote management apparatus 3 receives the apparatus status information acquisition request related to each registered apparatus transmitted from the apparatus information management apparatus 7. The apparatus status information acquisition request for each registered apparatus includes the apparatus identification information of the corresponding information providing apparatus 5.

Similar to steps S59 and S40, the data exchange unit 31 of the remote management apparatus 3 transmits the apparatus status information as a response to the apparatus status information acquisition request related to each registered apparatus. Accordingly, the data exchange unit 71 of the apparatus information management apparatus 7 receives the apparatus status information transmitted from the remote management apparatus 3. The apparatus status information includes various information such as the apparatus status information A and the apparatus status information B.

Similar to step S60 and step S41, after receiving the apparatus status information, the storing and reading unit 79 of the apparatus information management apparatus 7 writes the received apparatus status information in the apparatus status information management table stored in the apparatus status information management DB 7002 illustrated in FIG. 6B.

As described above, according to the second embodiment, the data exchange unit 71 of the apparatus information management apparatus 7 transmits the response including the apparatus registration reception code to the mediating apparatus 9 in step S52. The data exchange unit 91 of the mediating apparatus 9 that has received the response including the apparatus registration reception code transmits the apparatus registration request to the information providing apparatus 5 in step S53. As a result, need for communication from the information providing apparatus 5 to the communication network 100 is eliminated, changing the firewall settings and the like for the customer who uses the information providing apparatus 5 is not necessary, and the introduction to the various customer networks is facilitated.

In the apparatus management system 10 according to each of the above-described embodiment, when executing each process of steps S16, S39, S40, S58 and S59, another apparatus or the like may be provided between the apparatus information management apparatus 7 and the remote management apparatus 3. That is, the data exchange unit 31 of the remote management apparatus 3 may receive the apparatus registration request, the apparatus status information acquisition request, etc. transmitted by the data exchange unit 71 of the apparatus information management apparatus 7 through another apparatus or the like.

Various tables of the embodiments described above may be generated by learning effect of machine learning, and by classifying the data of each related item by machine learning, the tables may not be used. Here, the machine learning is a technology for making a computer acquire learning ability like a human being and the computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of these learning.

The apparatus management system, the remote management apparatus, and the remote management method according to the embodiments of the present disclosure have been described. The present disclosure is not limited to the above-described embodiments and can be modified within the range conceivable by those skilled in the art, such as addition, modification, or deletion of other embodiments. As long as the action and effect of the present disclosure are exhibited, it is included in the scope of the present disclosure. Further, the software library operated by the remote management system 2 may be incorporated and operated in the apparatus information management apparatus 7 and the mediating apparatus 9 included in the apparatus information management system 6.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An apparatus management system comprising:
a remote management apparatus configured to remotely manage one or more information providing apparatuses each of which provides information related to own apparatus; and
an apparatus information management apparatus configured to store information acquisition destination information indicating an information acquisition destination from which information on the one or more information providing apparatuses is to be acquired and apparatus status information indicating status of the one or more information providing apparatuses in association with each other;
the remote management apparatus including:
circuitry configured to:
receive, from the apparatus information management apparatus, an apparatus registration request for registering a specific information providing apparatus among the one or more information providing apparatuses;
in response to the apparatus registration request, transmit specific information acquisition destination information of the specific information providing apparatus to the apparatus information management apparatus;
receive, from the apparatus information management apparatus, an apparatus status information acquisition request for acquiring specific apparatus status information indicating the status of the specific information providing apparatus associated with the specific information acquisition destination information; and
transmit the specific apparatus status information to the apparatus information management apparatus as a response to the apparatus status information acquisition request.

2. The apparatus management system of claim 1, wherein the information acquisition destination information and the apparatus status information are associated with apparatus identification information for identifying the information providing apparatus.

3. The apparatus management system of claim 1, wherein the circuitry of the remote management apparatus is further configured to:
receive the apparatus registration request including specific apparatus identification information of the specific information providing apparatus; and
transmit the specific acquisition destination information as a response to the apparatus registration request including the specific apparatus identification information to the apparatus information management apparatus.

4. The apparatus management system of claim 3, wherein the circuitry of the remote management apparatus is further configured to:
generate a specific apparatus registration reception code associated with the specific apparatus identification information included in the apparatus registration request in response to receiving the apparatus registration request; and
transmit the specific acquisition destination information associated with the specific apparatus registration reception code to the apparatus information management apparatus as a response to the apparatus registration request.

5. The apparatus management system of claim 4, wherein the circuitry of the remote management apparatus is configured to generate the specific apparatus registration reception code by polling processing performed, at a certain interval, between the remote management apparatus and the information providing apparatus that has provided the apparatus identification information to the remote management apparatus.

6. The apparatus management system of claim 4, wherein the circuitry of the remote management apparatus is further configured to store in one or more memories, registration status of the specific information providing apparatus corresponding to the apparatus registration reception code.

7. The apparatus management system of claim 1, wherein the specific apparatus status information includes parts information of parts mounted on the specific information providing apparatus, remaining amount of consumables used in the information providing apparatus, replacement date and time, consumables information including an identification number, and usage status and identification number of specified parts.

8. A remote management apparatus configured to remotely manage one or more information providing apparatuses each of which provides information related to own apparatus, the remote management apparatus comprising:
   circuitry configured to:
   receive an apparatus registration request for registering a specific information providing apparatus among the one or more information providing apparatuses from an apparatus information management apparatus, the apparatus information management apparatus being configured to store information acquisition destination information indicating a destination from which information on the one or more information providing apparatuses is acquired and apparatus status information indicating the status of the one or more information providing apparatuses in association with each other;
   transmit specific information acquisition destination information of the specific information providing apparatus to the apparatus information management apparatus as a response to the apparatus registration request;
   receive, from the apparatus information management apparatus, an apparatus status information acquisition request for acquiring specific apparatus status information indicating a status of the specific information providing apparatus associated with the specific information acquisition destination; and
   transmit the specific apparatus status information to the apparatus information management apparatus as a response to the apparatus status information acquisition request.

9. A remote management method executed by a remote management apparatus configured to remotely manage one or more information providing apparatuses each of which provides information on own apparatus, the method comprising:
   receiving an apparatus registration request for registering a specific information providing apparatus among one or more information providing apparatuses transmitted from an apparatus information management apparatus, the apparatus information management being configured to store apparatus status information indicating status of the information providing apparatus and information acquisition destination information indicating a destination from which the information on the one or more information providing apparatuses is acquired in association with each other;
   transmitting specific information acquisition destination information of the specific information providing apparatus to the apparatus information management apparatus as a response to the apparatus registration request;
   receiving, from the apparatus information management apparatus, an apparatus status information acquisition request for acquiring specific apparatus status information indicating the status of the specific information providing apparatus associated with the specific information acquisition destination information; and
   transmitting the specific apparatus status information to the apparatus information management apparatus as a response to the apparatus status information acquisition request.

* * * * *